United States Patent [19]

Guss et al.

[11] E Patent Number: Re. 33,480

[45] Reissued Date of Patent: Dec. 11, 1990

[54] PUMP AND CONTAINER ASSEMBLY

[75] Inventors: Theodore Guss, Crystal Lake; Sing Fu, Wheeling, both of Ill.

[73] Assignee: Continental Can Company, Inc., Norwalk, Conn.

[21] Appl. No.: 432,887

[22] Filed: Nov. 7, 1989

Related U.S. Patent Documents

Reissue of:

[64] Patent No.: 4,863,071
Issued: Sep. 5, 1989
Appl. No.: 221,217
Filed: Jul. 19, 1988

[51] Int. Cl.[5] ..... B67D 5/40

[52] U.S. Cl. ..... 222/207; 222/214; 222/383; 239/329

[58] Field of Search ..... 222/206–207, 222/209, 214, 372, 382–383, 129, 94, 464, 478, 479; 239/329, 333; 215/1 C, 31

[56] References Cited

U.S. PATENT DOCUMENTS

| | | | |
|---|---|---|---|
| 3,158,183 | 11/1964 | Brown et al. | 222/207 X |
| 3,575,949 | 4/1971 | Humphrey | 222/207 X |
| 4,201,317 | 5/1980 | Aleff | 222/207 |
| 4,232,828 | 11/1980 | Shelly, Jr. | 239/329 |
| 4,310,107 | 1/1982 | Wesner | 222/214 |
| 4,600,130 | 7/1986 | Libit | 222/209 |

*Primary Examiner*—Michael S. Huppert
*Attorney, Agent, or Firm*—Charles E. Brown; Paul Shapiro; Charles A. Brown

[57] ABSTRACT

This relates to a container and pump unit where the container is formed with an integral liquid product supply tube in lieu of the usual dip tube carried by the pump unit and wherein there is a special connector arrangement for connecting a conventional type of pump unit, but modified, to such container. The container is provided with a smooth sealable end surface and the connector assembly includes a gasket which closes off the dual passages at the container mouth with there being a seal plate which engages the gasket and provides a liquid product delivery passage and a vent passage. These two passages are separately connected to the pump unit.

15 Claims, 2 Drawing Sheets

64
66
24
18
28
68
60
98
80
52
26
46
70
50
22
78
44
90
88
92
86
84
96
74
48
72
76
56
94
82
54
20
40
62
42
18

PUMP AND CONTAINER ASSEMBLY

Matter enclosed in heavy brackets [ ] appears in the original patent but forms no part of this reissue specification; matter printed in italics indicates the additions made by reissue.

This invention relates in general to new and useful improvements in containers and pump assemblies for liquids such as liquid cleaners and the like and more particularly to a pump and container assembly wherein the customary dip tube is eliminated.

The commercially available pump and container assembly of the type to which this invention relates includes a dip tube which is carried by the pump and which extends through a customary circular cross sectional mouth of the container. This invention most particularly relates to the formation of a container having an integrally formed supply tube and to a pump connector wherein a conventional type of pump may be connected to such a specialized container.

Pump and container assemblies wherein the pump is provided with a dip tube present problems to the industry. First of all, warped dip tubes are currently a major problem in pump/bottle assemblies with a resultant undesired amount of scrap. The elimination of the conventional dip tube eliminates this major problem.

When the pump has no depending dip tube, the pump attachment apparatus need not be lowered the length of the dip tube with a resulting increase in speed of assembly of a pump for the container.

Inasmuch as the neck finish of the container is generally along the center line thereof, the dip tube is also positioned along the center line of the container. However, a preferred position of the dip tube is in a bottom corner of the container. This can be accomplished by having the product supply tube integrally molded in the container and terminating in a bottom corner of the container.

When the dip tube is eliminated, it cannot become separated from the pump as frequently occurs. Further, when the container is of the refillable type, and the pump is to be removed from the container, with the elimination of the dip tube, there is no column of fluid remaining with the pump that can dribble during refill.

In view of the foregoing disadvantages of our present day pump and container assemblies, in accordance with this invention it is proposed to provide a container which is provided with an integral liquid product supply tube which extends through the mouth of the container and wherein there is provided a pump connector for connecting a conventional type of pump to such a container whereby the conventional dip tube may be eliminated.

With the above and other objects in view that will hereinafter appear, the nature of the invention will be more clearly understood by reference to the following detailed description, the appended claims, and the several views illustrated in the accompanying drawings.

Figure 1:
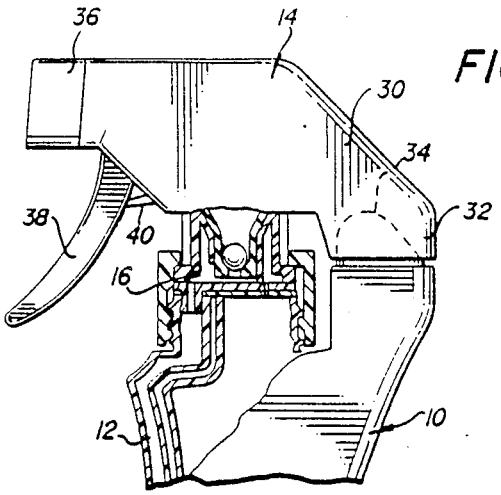
FIG. 1 is an elevational view of an upper part only of a container having mounted thereon a pump in accordance with this invention, portions of the pump and container being broken away and shown in section.

Referring now to the drawings in detail, it will be seen that there is illustrated in FIG. 1 the upper portion only of a container 10 of a conventional design which is specifically constructed in accordance with this invention to include an integral liquid product supply tube 12. The container 10 carries a conventional type of pump unit 14 which is releasably mounted on the container 10 and is coupled to the container 10 by way of a pump connector generally identified by the numeral 16.

Figure 2:
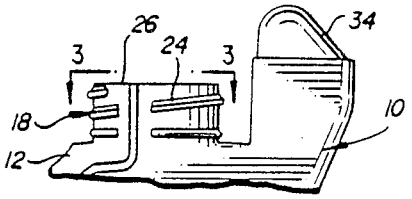
FIG. 2 is an elevational view of the upper portion only of the container and shows more specifically the details of the container.
Figure 3:
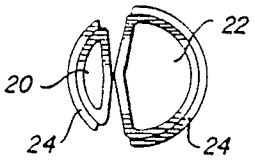
FIG. 3 is a plan view of the neck finish only of the container taken generally along the line 3—3 of FIG. 2.

Referring now to FIGS. 2 and 3, it will be seen that while the container 10 is of a conventional configuration, the constructional details thereof vary from present day commercial containers in that in the blow molding of the container 10, an edge portion of the container will be squeezed to define an integral liquid product supply tube 12 as previously described. The supply tube 12 extends through a neck finish portion 18 of the bottle which defines the mouth of the container 10. As is clearly apparent in FIG. 3, the mouth of the container is divided into a liquid product supply opening 20 and a combination vent and filling opening 22. Externally, the neck finish 18 is provided with threads or like pump securing means 24. Due to the construction of the container 10, particularly in the neck finish area, the threads 24 or like securing means are interrupted.

Because the product supply passage 20 is to be under a negative pressure or vacuum, it is necessary that there be a seal at the mouth of the container between the passages 20, 22. In order to accomplish this, the neck finish 18 is provided with a sealing end surface 26 which is preferably machined.

Figure 4:
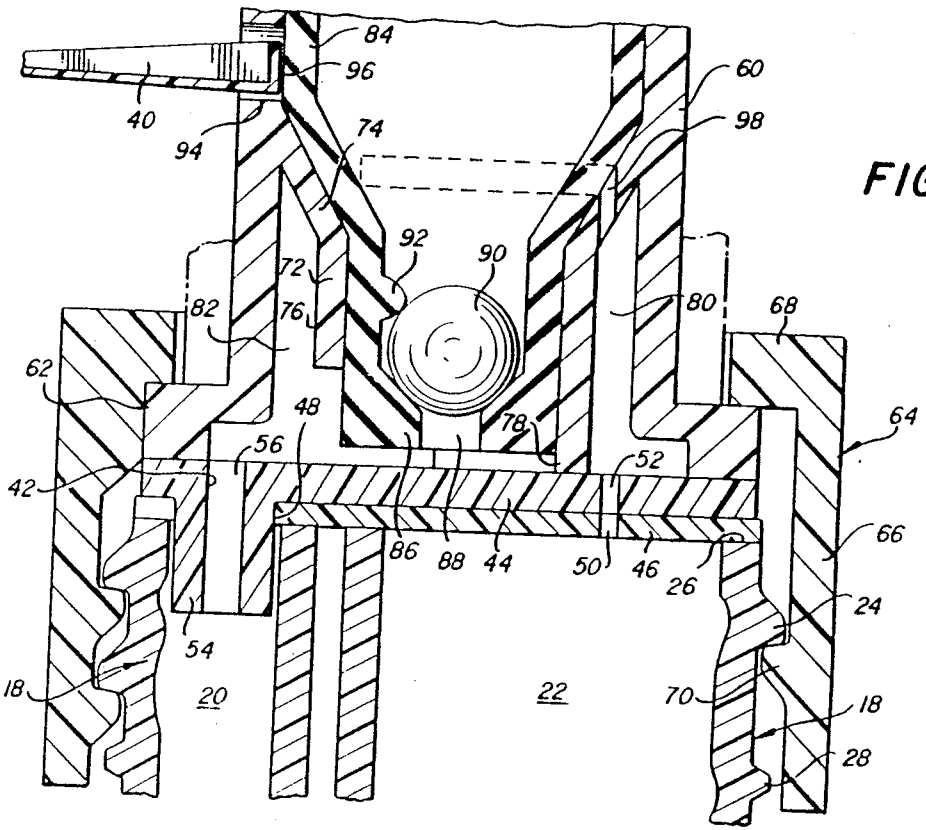
FIG. 4 is an enlarged fragmentary sectional view taken through the upper part of the container and the lower part of the pump and shows most specifically the details of the container, the pump and the pump connector between the container and the pump.

At this time, it is pointed out that the neck finish 18 may be generally of the configuration shown in FIG. 4 where the threads 24 and a capping flange 28 are solid or the neck finish 18 may be of a thin wall construction with the threads 24 and the capping bead or flange 28 being generally hollow. In such event, the neck finish 18 would include a molded inturned end flange (not shown).

At this time it is to be noted that blow molded containers having a pinched off integral liquid product supply tube such as the supply tube 20 is known from U.S. Pat. No. 3,575,949 and, accordingly, the container 10 per se is not considered to be the subject of this invention. The same is true for a major part of the pump unit 14.

First of all, it is to be noted that the pump unit 14 includes a housing 30 which has a rear portion 32 that seats on an upstanding projection 34 formed on the container 10 as is best shown in FIG. 2, to prevent twisting of the pump unit relative to the container.

The pump unit 14 will be provided at the opposite end thereof with a rotatable spray selector 36 to which there is connected a discharge tube (not shown). Rearwardly of the spray selector 36 and pivotally mounted generally within the housing 30 is a trigger 38 which per se forms no part of this invention in that it is conventional as are the foregoing described parts of the pump unit 14. The trigger 38 carries a pumping element 40, the function of which will be described in more detail hereinafter.

Referring now to FIG. 4, it will be seen that there are illustrated the details of a pump connector which is generally the subject of this invention and which is identified by the numeral 42. The pump connector 42 includes a separately molded seal member 44 in the form of a seal plate which overlies the end of the neck finish 18 and is sealed relative to the end sealing surface 26 by way of a gasket 46. It is to be noted that the gasket 46 is provided with an enlarged opening 48 aligned with the liquid product supply or dispensing passage 20 and a small opening 50 which is in alignment with the combined vent and filling passage 22. The opening 50 is a vent opening and is aligned with a vent 52 in the seal plate 44. The opening 48 has received therethrough a depending tubular extension 54 of the seal plate 44 with there being a supply passage 56 extending therethrough. It is to be understood that the gasket 46 seals off the mouth of the container 10 except for the vent opening 46 and the opening 48 and thus provides two separate and independent passages 52 and 56 out of the container 10.

The pump unit 14 includes a tubular housing member 60 which terminates in its lower end in an offset annular mounting portion 62 which seats on the sealing plate 44 in sealed relation. The mounting portion 62 is clamped against the sealing plate 44 by way of a shell 64 which is of a conventional type and which includes a tubular portion 66 which terminates at its upper end in an annular end member 68. The tubular portion 66 is provided with internal threads 70 which cooperate with the threads 24 on the neck finish 18 so as to draw the annular end panel 68 down tight against the upper surface of the mounting portion 62.

The lower part of the housing portion 60 carries an internal support 72 which has a downwardly and inwardly sloping conical upper portion 74 terminating in a lower cylindrical portion 76. The cylindrical portion 76, adjacent the vent passage 52, includes a lower extension 78 which seats on the sealing plate 44 in sealed relation and divides the interior of the support member 60 into a vent passage 80 in communication with the vent passage 52 and a liquid area 82 which is in communication with the passage 56.

A resiliently deformable pump member 84 of a size and shape corresponding generally to the interior of the support member 60 is seated in the support member 60. The pump member includes a tubular lower part 86 having an inlet opening 88 which is closed against back flow by a ball type check valve member 90 which is retained in position by an internal projection 92 on the tubular portion 86.

It is to be noted that a part of the support member 60 is provided with an opening 94 through which passes the pumping element 40. It is to be noted that the pumping element 40 is of a generally U-shaped cross section and terminates in an end wall 96 which bears against the exterior of the pump element or member 84.

It is also to be understood at this time that the upper part of the pump element 84 is connected to the discharge tube which leads into the spray element 36 as is conventional.

As in the case of conventional pump units, when the trigger 38 is squeezed, the pumping element 40 will move to the right in FIGS. 1 and 4, rearwardly inwardly deforming the pump element 84 to reduce the volume defined by the pump element 84. Since the liquid contained within the pump element 84 cannot go back into the container because of the check valve, it will be pumped out through the spray member 36. When the trigger 38 is released, because of the resiliency of the pump element 84, the pump element 84 will again resume its original shape, causing the trigger 38 to return to its original position. At this time, a vacuum will exist within the pump element 84 drawing liquid up from the bottom of the container 10 through the liquid product supply passage 20.

As the liquid product is dispensed from the container 10, it is necessary that air replace the liquid product. For this reason, the vent passage 80 must be opened to the atmosphere. In the illustrated embodiment of the invention, there is a further vent passage 98 which is in communication with the vent passage 80 and this vent passage extends around the interior of the portion 74 and then externally of the housing 30 to the atmosphere. The vent passage 98 is normally closed by the pump element, but opens to the atmosphere when the pump member 84 is deformed during the pumping operation.

It is to be understood that the sealing plate 44 and the associated gasket 46 may be preassembled with the pump unit 14 so that they may be applied as a unit to the container 10.

Although in the illustrated embodiment of the invention the pump unit 14 is specifically configurated to cooperate with the projection 34 in the container, it is to be understood that it is feasible that the pump unit 14 be secured in place solely by the shell 64.

It is also feasible to have the vent passage 80 vented through the mounting portion 62 to the atmosphere within the shell 64 and down through the space between portions of the threads 24.

Although only a preferred embodiment of the pump connection has been specifically illustrated and described herein, it is to be understood that minor variations may be made in the pump connector and the associated elements of the container and pump unit without departing from the spirit and scope of the invention as defined by the appended claims.

We claim:

1. A pump connection for use with a container having a neck finish including a dual passage mouth of the type including an integral dispensing tube and a sealable end surface, said pump connection comprising a gasket separately sealable relative to each passage of a dual passage container mouth, a seal member overlying said gasket and providing spaced and separate fluid and vent passages opening from said gasket, a pump housing carrying a [resiliently deformable] pump element in sealed relation with said fluid passage, and a hold down member engageable with a container neck finish for clamping said pump housing *and seal member* against said [seal member] *gasket.*

2. A pump connection according to claim 1 wherein said seal member has a tubular extension extending through said gasket.

3. A pump connection according to claim 1 wherein said seal member is in the form of a seal plate.

4. A pump connection according to claim 1 wherein said seal member is in the form of a seal plate, and said seal plate has a tubular extension extending through said gasket.

5. A pump connector according to claim 1 wherein said vent passage opens to the atmosphere.

6. A pump connector according to claim 1 wherein said vent passages opens to the atmosphere through said pump housing.

7. A pump connector according to claim 6 wherein said pump element forms a releasable seal for said vent passage.

8. A pump connector according to claim 6 wherein said pump element forms a releasable seal for said vent passage with said vent being open when said pump element is actuated.

9. A pump connector according to claim 1 wherein said pump element has an inlet end opposing and spaced from said seal member.

10. A pump connector according to claim 1 wherein said pump element has an inlet end opposing and spaced from said seal member, and there is a check valve in said pump element adjacent said inlet end.

11. A pump connection according to claim 1 wherein *said pump element is resiliently deformable, and* said pump housing carries a trigger having a pumping element engaging said pump element and being operable by said trigger for effecting a deformation of said pump element to reduce the volume of said pump element and thus produce a pumping action.

12. A pump connection according to claim 1 wherein said pump connection is mounted on a container having a dual passage mouth and is sealed to said container mouth by said gasket.

*13. A pump connection according to claim 1 wherein said pump element is resiliently deformable.*

*14. A pump element according to claim 1 wherein said hold down clamps said pump housing against said seal member.*

*15. A pump connection according to claim 1 wherein said pump element is resiliently deformable, and said hold down clamps said pump housing against said seal member.*

* * * * *